(12) United States Patent
Farahat et al.

(10) Patent No.: US 8,667,133 B2
(45) Date of Patent: Mar. 4, 2014

(54) METHODS AND SYSTEMS FOR DETERMINING THE EFFECT OF A HOST ON NETWORK LATENCY WHILE DELIVERING ONLINE ADS

(75) Inventors: Ayman Farahat, San Francisco, CA (US); Prasad Chalasani, New York, NY (US); Tarun Bhatia, Oak Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 82 days.

(21) Appl. No.: 13/565,531

(22) Filed: Aug. 2, 2012

(65) Prior Publication Data

US 2014/0040455 A1    Feb. 6, 2014

(51) Int. Cl.
*G06F 15/16* (2006.01)
(52) U.S. Cl.
USPC ........................................... 709/224; 709/223
(58) Field of Classification Search
USPC .................................. 709/200–203, 217–227
See application file for complete search history.

(56) References Cited

U.S. PATENT DOCUMENTS

| | | | | |
|---|---|---|---|---|
| 6,601,098 B1 * | 7/2003 | Case et al. | ..................... | 709/224 |
| 7,236,584 B2 * | 6/2007 | Torba | ....................... | 379/266.08 |
| 8,064,486 B2 * | 11/2011 | Pan | ................................ | 370/516 |
| 8,339,965 B2 * | 12/2012 | Zhang et al. | .................. | 370/241 |
| 2003/0002654 A1 * | 1/2003 | Torba | ....................... | 379/266.08 |
| 2009/0067338 A1 * | 3/2009 | Pan | ................................ | 370/249 |
| 2009/0209349 A1 * | 8/2009 | Padhye et al. | .................. | 463/42 |

\* cited by examiner

*Primary Examiner* — Moustafa M Meky
(74) *Attorney, Agent, or Firm* — Mauriel Kapouytian Woods LLP; James Woods (57) ABSTRACT

Methods and systems for determining the effect of a host on network latency while delivering online ads are disclosed. Observational test data relating to one or more network latency tests conducted on a plurality of hosts may be obtained. A first group and a second group of hosts may be created, wherein the first group includes the host and the second group doesn't include the host. At least one predetermined metric for each of the first group and the second group is computed based on the test data. A ratio of the at least one predetermined metric for the first group to the at least one predetermined metric for the second group is computed. The host may then be ranked based at least in part on the ratio.

20 Claims, 5 Drawing Sheets

METHODS AND SYSTEMS FOR DETERMINING THE EFFECT OF A HOST ON NETWORK LATENCY WHILE DELIVERING ONLINE ADS

BACKGROUND

Online advertising marketplaces and exchanges may involve, for example, entities or parties including advertisers, publishers and data providers, as well as a marketplace or online advertising operations facilitator, or market-maker. Operating the online advertising marketplaces and exchanges involves balancing several diverse participant goals. One such goal involves managing network latencies that hurt user experience, resulting in revenue loss. Network latencies arise from the need to go through several hops across differentiated or intermediary hosts in the marketplace to get the best response for an ad call.

There is a need for improved techniques in online advertising, including in online advertising marketplaces and exchanges to identify the hosts that cause much of this network latency.

SUMMARY

Some embodiments of the invention provide systems and methods for determining the effect of a host on network latency. Observational test data relating to one or more network latency tests conducted on a plurality of hosts may be obtained. In one embodiment, the observational test data may be obtained from a third party data service such as Gomez™ by Compuware APM. The tests may include tests such as back-bone and last-mile. As will be apparent to one of ordinary skill in the art, back-bone tests measure end-to-end latency from the backbone node making the request for an ad call and the ad being returned, and last-mile tests measure the same end to end latency from the end user's perspective, on their devices (e.g., user computers 104). "Hosts" as used herein refers to any one of the nodes of an exchange graph (e.g., exchange graph 200 of FIG. 2), including publishers, ad-network entities, and advertisers.

In one embodiment, the test data may be processed to remove effects of instrumentation trace. For example, the process of gathering the test data may have introduced some latency and the test data may be processed to remove the hops corresponding to the instrumentation services used to collect the test data. The test data may also be corrected for bias resulting from the difference between real time ad calls and synthetic ad calls. The synthetic ad calls may be the calls that were part of the test data collection process.

A first group and a second group of hosts may be created, wherein the first group includes the host and the second group doesn't include the host. In other words, for each host of the plurality of hosts, the hosts may be divided into two test populations or groups: a first group which includes a test population where the host appears at least once in an ad call; and a second group which includes a test population where the host does not appear in an ad call.

At least one predetermined metric for each of the first group and the second group is computed based on the test data. The metric(s) may be selected from one or more metrics such as service level agreement (SLA) violation percent, SLA violation severity, round trip test latency, gluttony index, etc.

A ratio of the at least one predetermined metric for the first group to the at least one predetermined metric for the second group is computed. Using the round trip test latency as an example, the round trip test latency is computed for the first group and the second group. A ratio of the round trip test latency for the first group and the round trip test latency for the second group is then computed. The host may be ranked based at least in part on the ratio. By comparing the statistical differences between the two test populations or groups (e.g., by computing the ratio), as discussed above, the differences may be attributed to the host. For instance, using the end-to-end round trip latency as an example, if this latency metric is much higher for the test group with the host than for the test group without the host, the difference may be attributed to the host having a negative effect on that latency metric. Thus, in one embodiment, the hosts may be ranked in decreasing order based on the ratio.

BRIEF DESCRIPTION OF THE DRAWINGS

The systems and methods described herein may be better understood with reference to the following drawings and detailed description. Non-limiting and non-exhaustive embodiments are described with reference to the following drawings.

DETAILED DESCRIPTION

Figure 1:
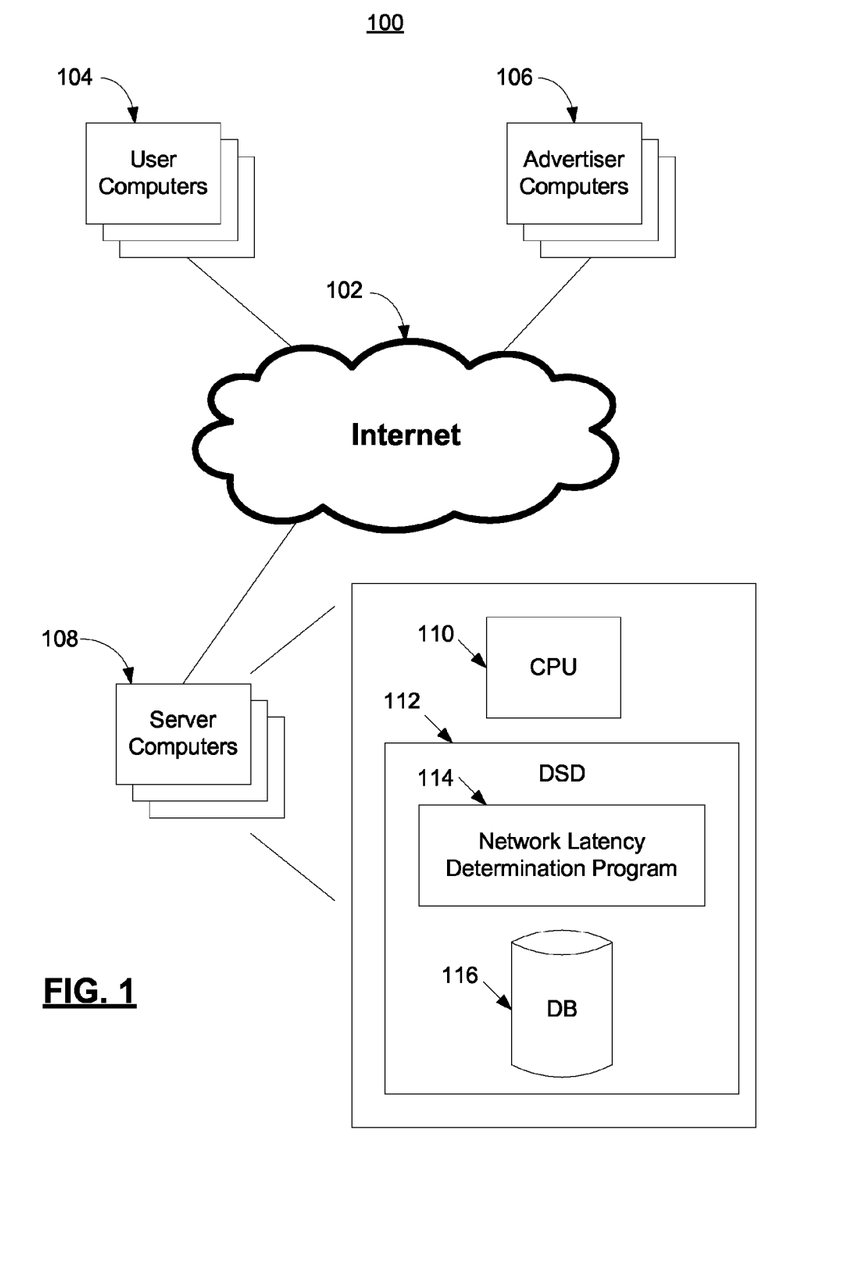
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers 104 may be or include desktop or laptop PCs, as well as, wireless, mobile, or handheld devices such as cell phones, PDAs, tablets, etc.

Each of the one or more computers 104, 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Network Latency Determination Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

The system 100 further includes users that access web pages on publisher websites through web browsers (not shown) running on user computers 104 over a communications network, such as the Internet 102. The users may access and download web pages on their computers 104, such as a desktop, a laptop, tablet, or a smart phone (not shown).

Server computers 108 may include a web server, which may include a search engine as well as general delivery of publisher web sites browsed to users, and may also include one or more ad exchange servers, all of which may be coupled together, either directly or over a communications network, such as the Internet 102. Herein, the phrase "coupled with" is defined to mean directly connected to or indirectly connected through one or more intermediate components. The ad exchange server (not shown) may be integrated within the web server (not shown) in some embodiments. In an exemplary embodiment, the ad exchange server receives a request from the web server for ads to be delivered to a search results or other page in response to a query submitted by a user or to a browsing or linking action that led the user to download a publisher web page. The request creates an advertisement display opportunity, whether on a search results page or another web page of a publisher website. Accordingly, the web server may host one or more affiliate publishers.

If a user browses or links to a publisher website, which may be through a search results page, a search engine page, or any other publisher website, the web server may supply the web page for download by user computer 104. Before supplying the web page, however, the web server may request that the ad exchange server deliver an ad that may be not only relevant to the web page being downloaded, but also that somehow targets the user downloading the web page. Again, this creates an ad display opportunity, which requires that the ad exchange server process the ad exchange graph, which may be stored in a database, to compute bids from advertisers for ads that are valid for the opportunity. The ad exchange server may internally run an auction on behalf of the publisher that supplied the opportunity. Therefore, the publisher is the entity which gets paid, and the auction winner is the advertiser that causes the publisher to be paid the most.

Publishers create display opportunities for online advertising on their web pages, which are published to the Internet. These include an inventory of advertising slots, also referred to as advertising supply. Advertisers have a demand of advertisements (ads) with which they want to fill the advertising slots on the publisher web pages. The ads of the advertisers may be matched, in real time, with specific display opportunities in an ad exchange.

Further, an ad-network is a business that operates an exchange on behalf of a collection of publisher customers and a collection of advertiser customers, and is responsible for ensuring that the best, valid ad from one of its advertisers is displayed for each opportunity that is generated in real time by one of its publishers. Traditionally, an ad-network would do this by running its own ad servers, but it may instead delegate its ad-serving responsibilities to an ad-exchange such as Yahoo! of Sunnyvale, Calif., which can be viewed as a "meta-ad-network" that operates on behalf of a collection of ad-networks, and transitively the publishers and advertisers managed by those ad-networks, plus some "self-managed" publishers and advertisers that participate directly in the ad-exchange. The meta-ad-network operates as a meta-ad-exchange (hereafter, merely "exchange") to connect publishers and advertisers across multiple ad-networks.

The exchange operates one or more ad servers (e.g., server computers 108), which have required more resources as the number of participating ad-networks, publishers, and advertisers has grown. The business relationships between these entities can be represented in the exchange as an exchange graph (see, FIG. 2) including nodes that represent the ad-networks, the publishers, and the advertisers. Additionally, the exchange graph includes edges that connect the nodes that may include one or more predicates, which in a broadest sense, are the parts of propositions that are affirmed or denied about a subject. Such a subject in this case could be a constraint or requirement of some kind, such as arising from a contract or other business relation germane to the meta-ad-network.

Unlike many other ad-networks and exchanges, Yahoo!'s Exchange contains not only publishers and advertisers, but also intermediate ad-network entities that can link together publishers and advertisers that do not have direct relationship.

Figure 2:
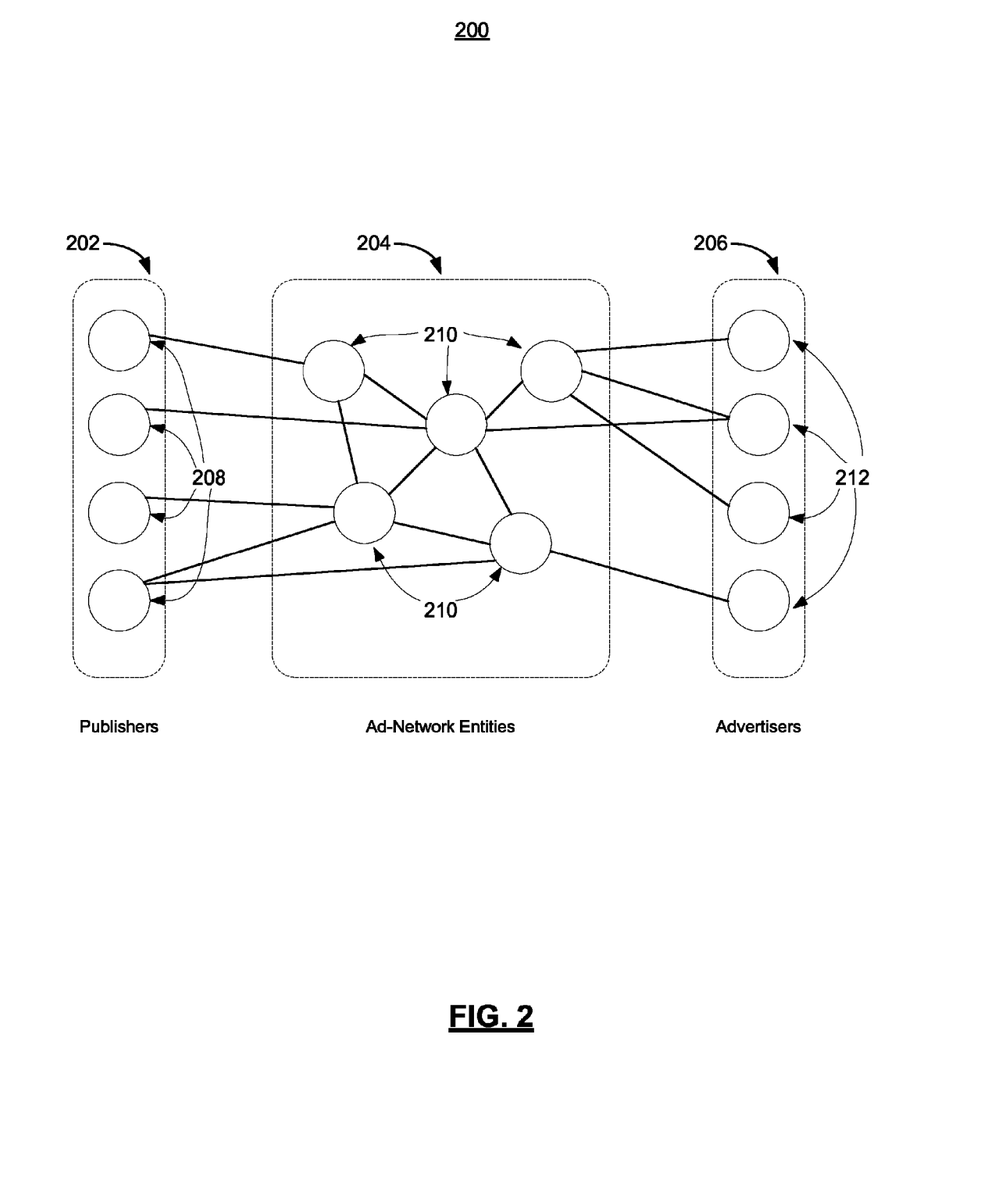
FIG. 2 is an exemplary exchange graph diagram according to one embodiment of the invention.

The ad exchange includes publishers and advertisers, as well as intermediate ad-network entities in many cases, all represented in an exchange graph (as shown in FIG. 2 and discussed below) which includes nodes, and further includes edges that interconnect the nodes, thus creating a multiplicity of possible paths. The edges include predicates with which compliance is required in order to traverse the path to fill an opportunity with a specific advertisement from a specific advertiser. The predicates associated with edges along a path include intermediaries that introduce complications into ad selection that are often intractable in resolution. This is because now, not only must a winning advertiser bid be chosen, but a winning pair (ad and path) needs to be found to maximize profit to the publisher that generated the opportunity while also meeting all legality predicates along that path.

Moreover, the legality of a path depends not only on the individual legality of the edges of a path given the current display opportunity, but also on constraints that allow edges to have veto power over the endpoints of the path, which are additional predicates. In the ad serving role, therefore, an exchange needs to, in real time and with low latency, select an ad and a path leading to that ad, subject to feasibility and optimality requirements which can depend on the characteristics of the particular user who is at that moment loading a web page from a website of a publisher.

Exchange graph information, including predicates related to business relationships of participants in the exchange, may be stored in a database in one or more server computers 108. The predicates may include demand predicates and supply predicates, as well as legality predicates.

A demand predicate may be a function whose inputs include properties of one or more of the ads. The properties of the ads, therefore, are targetable by one or more demand predicates. A supply predicate may be a function whose inputs include properties of a user. The properties of the users, therefore, are targetable by one or more supply predicates. A legality predicate may be a Boolean AND of a supply predicate and a demand predicate at a node or edge of an exchange graph. Other logical relations may be used to combine a supply predicate and a demand predicate into a legality predicate, to constrain any node or edge of the exchange graph.

FIG. 2 is a diagram of an exemplary exchange graph 200. A plurality of nodes 208 represent the publishers 202, a plurality of nodes 210 represent ad-network entities 204, and a plurality of nodes 212 represent advertisers 206. A plurality of graph edges 214 interconnects nodes 212, 210, and 208 of the advertisers 206, the ad-network entities 204, and of the publishers 202, respectively. The plurality of graph edges 212 represent interconnections between advertisers 206 having ads that may meet the legality and optimality requirements to fill display opportunities provided by the publishers 202. The ad exchange server finds the optimal and legal path between an opportunity of a publisher 202 and a specific advertisement of an advertiser 206, as discussed above. The ad exchange server finds the optimal and legal path through the exchange graph 200, which thus meets a plurality of legality predicates as discussed above, and maximizes payout to the publisher 208 providing an identified display opportunity.

Figure 3:
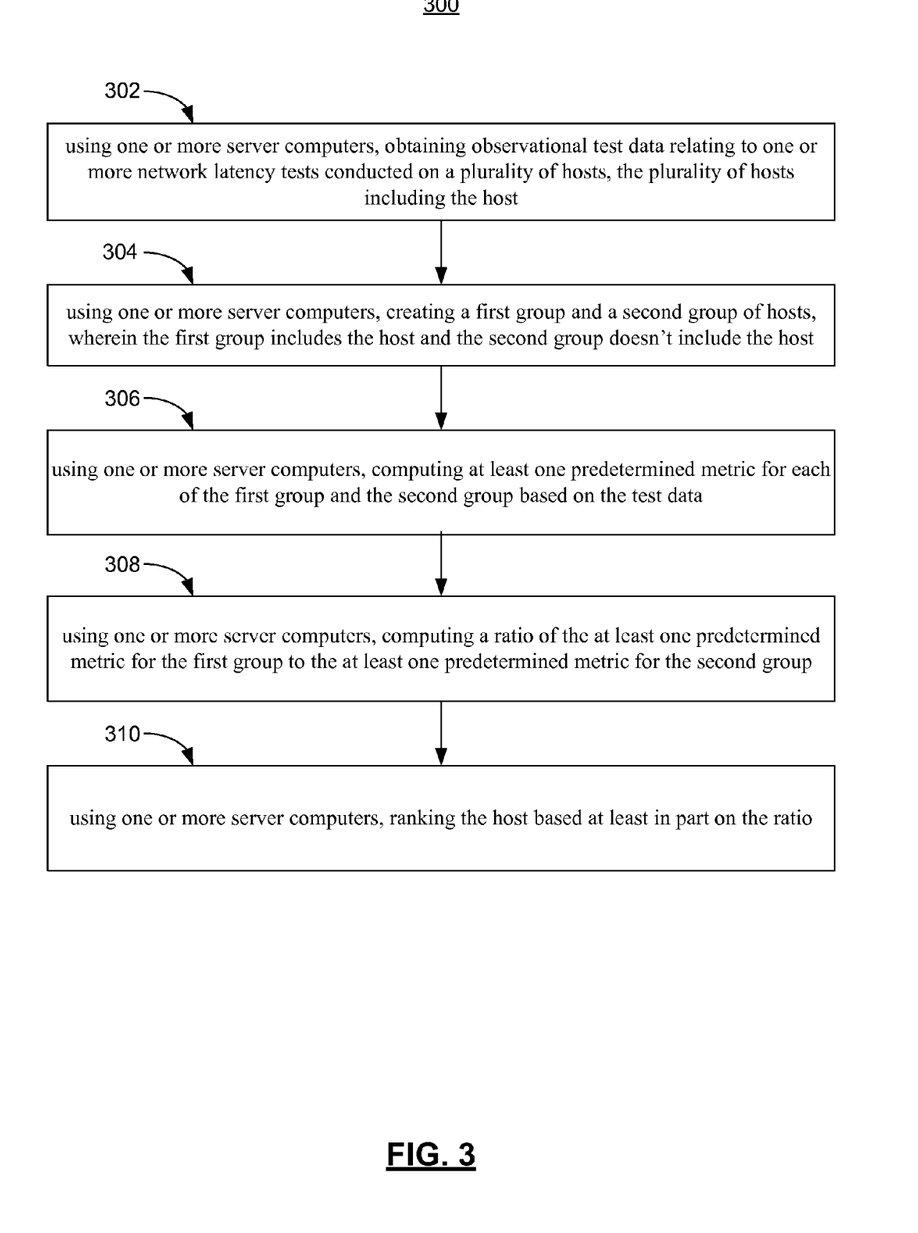
FIG. 3 is a flow diagram illustrating a method according to one embodiment of the invention.

FIG. 3 is a flow diagram illustrating a method 300 according to one embodiment of the invention. At step 302, using one or more server computers, observational test data relating to one or more network latency tests conducted on a plurality of hosts may be obtained. In one embodiment, the observational test data may be obtained from a third party data service such as Gomez™ by Compuware APM. The tests may include tests such as back-bone and last-mile. As will be apparent to one of ordinary skill in the art, back-bone tests measure end-to-end latency from the backbone node making the request for an ad call and the ad being returned, and last-mile tests measure the same end to end latency from the end user's perspective, on their devices (e.g., user computers 104). "Hosts" as used herein refers to any one of the nodes of an exchange graph (e.g., exchange graph 200 of FIG. 2), including publishers, ad-network entities, and advertisers.

At step 304, using one or more server computers, a first group and a second group of hosts may be created, wherein the first group includes the host and the second group doesn't include the host. In other words, for each host of the plurality of hosts, the hosts may be divided into two test populations or groups: a first group which includes a test population where the host appears at least once in an ad call; and a second group which includes a test population where the host does not appear in an ad call.

At step 306, using one or more server computers, at least one predetermined metric for each of the first group and the second group is computed based on the test data. The metric(s) may be selected from one or more metrics such as service level agreement (SLA) violation percent, SLA violation severity, round trip test latency, gluttony index, etc. As used herein, the gluttony index is computed as the average time-fraction spent with a host as a percent of total test time, divided by the average occupancy-fraction (number of occurrences) of the host as a percent of number of hops in the test. This metric allows identification of hosts that "hog" the response time budgets disproportionately, relative to others. By way of a metaphor, assume you invite many guests or sub-groups to dinner on many occasions and measure the amount of food they consume at the dining table. You then compute the overall proportion consumed relative to the number of seats occupied by the person or the group in each dining instance, and average over time to compute an index. The gluttony index thus relates the proportional consumption relative to seat occupancy at the table. By normalizing over all dining instances, you would be normalizing over all the other guests the group co-dined with.

At step 308, using one or more server computers, a ratio of the at least one predetermined metric for the first group to the at least one predetermined metric for the second group is computed. Using the round trip test latency as an example, the round trip test latency is computed for the first group and the second group. A ratio of the round trip test latency for the first group and the round trip test latency for the second group is then computed. At step 310, using one or more server computers, the host may be ranked based at least in part on the ratio.

Figure 4:
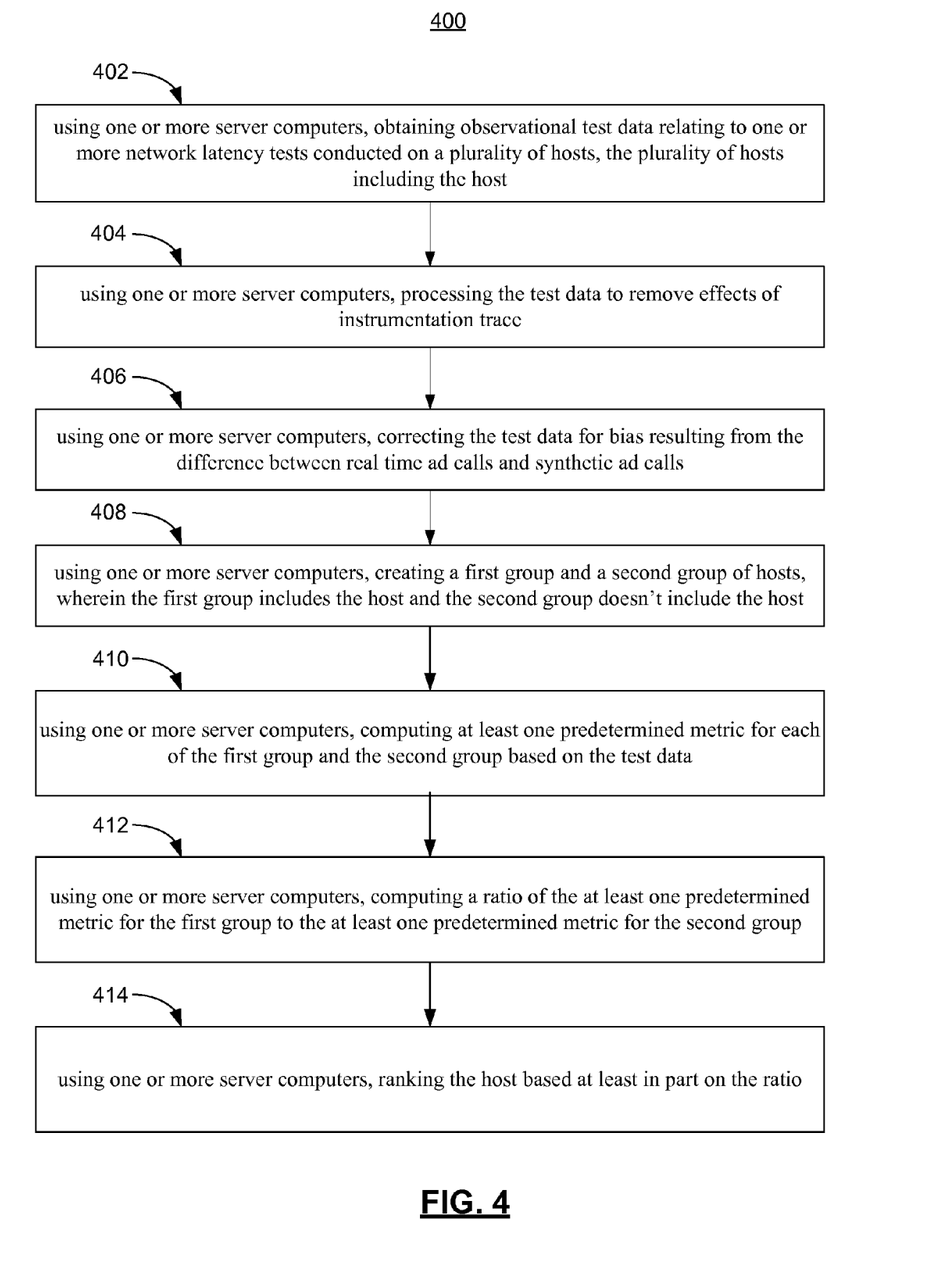
FIG. 4 is a flow diagram illustrating a method according to one embodiment of the invention.

FIG. 4 is a flow diagram illustrating a method 400 according to one embodiment of the invention. At step 402, using one or more server computers, observational test data relating to one or more network latency tests conducted on a plurality of hosts may be obtained. In one embodiment, the observational test data may be obtained from a third party data service such as Gomez™ by Compuware APM. The tests may include tests such as back-bone and last-mile. As will be apparent to one of ordinary skill in the art, back-bone tests measure end-to-end latency from the backbone node making the request for an ad call and the ad being returned, and last-mile tests measure the same end to end latency from the end user's perspective, on their devices (e.g., user computers 104). "Hosts" as used herein refers to any one of the nodes of an exchange graph (e.g., exchange graph 200 of FIG. 2), including publishers, ad-network entities, and advertisers.

At step 404, the test data may be processed to remove effects of instrumentation trace. For example, the process of gathering the test data may have introduced some latency and the test data may be processed to remove the hops corresponding to the instrumentation services used to collect the test data.

At step 406, the test data may be corrected for bias resulting from the difference between real time ad calls and synthetic ad calls. The synthetic ad calls may be the calls that were part of the test data collection process.

At step 408, using one or more server computers, a first group and a second group of hosts may be created, wherein the first group includes the host and the second group doesn't include the host. In other words, for each host of the plurality of hosts, the hosts may be divided into two test populations or groups: a first group which includes a test population where the host appears at least once in an ad call; and a second group which includes a test population where the host does not appear in an ad call.

At step 410, using one or more server computers, at least one predetermined metric for each of the first group and the second group is computed based on the test data. The metric(s) may be selected from one or more metrics such as service level agreement (SLA) violation percent, SLA violation severity, round trip test latency, gluttony index, etc.

At step 412, using one or more server computers, a ratio of the at least one predetermined metric for the first group to the at least one predetermined metric for the second group is computed. Using the round trip test latency as an example, the round trip test latency is computed for the first group and the second group. A ratio of the round trip test latency for the first group and the round trip test latency for the second group is then computed. At step 414, using one or more server computers, the host may be ranked based at least in part on the ratio. By comparing the statistical differences between the two test populations or groups (e.g., by computing the ratio), as discussed above, the differences may be attributed to the host. For instance, using the end-to-end round trip latency as an example, if this latency metric is much higher for the test group with the host than for the test group without the host, the difference may be attributed to the host having a negative effect on that latency metric. Thus, in one embodiment, the hosts may be ranked in decreasing order based on the ratio.

Figure 5:
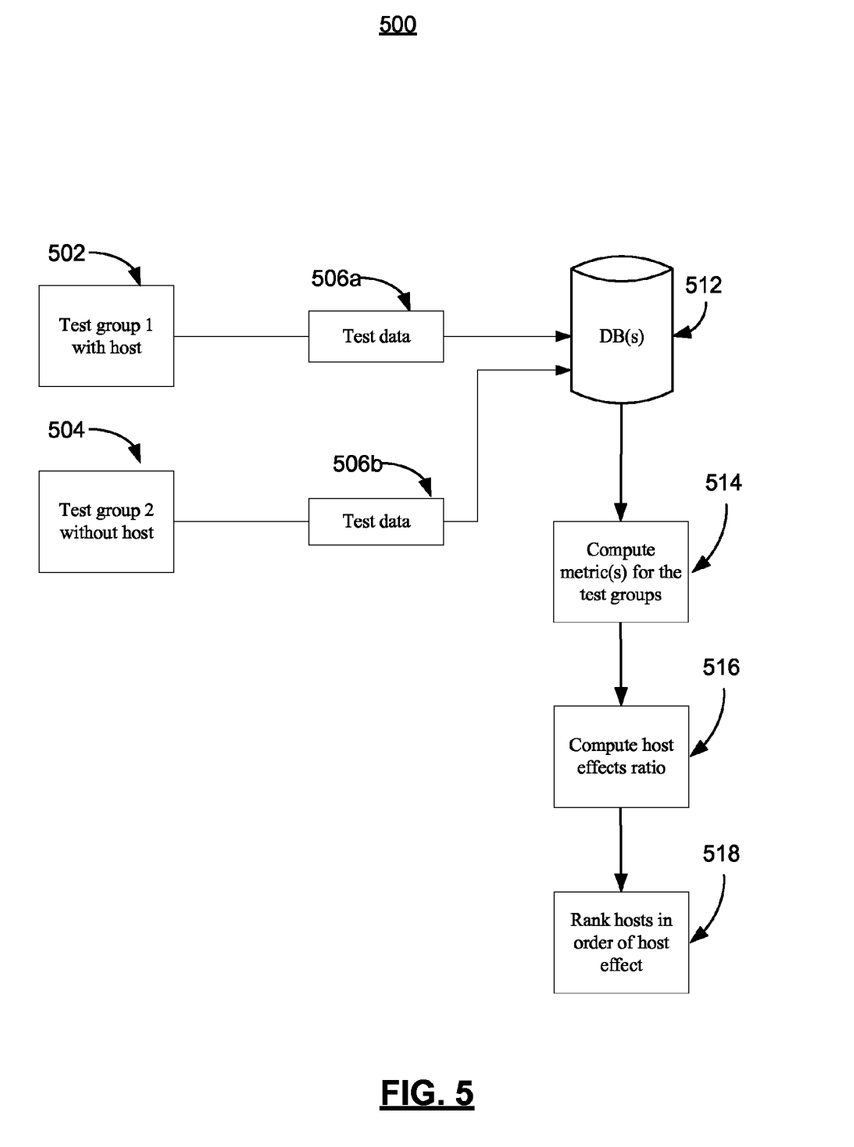
FIG. 5 is a block diagram according to one embodiment of the invention.

FIG. 5 illustrates a block diagram of a system 500 according to one embodiment of the invention. One or more data stores or databases 512 are depicted. Various types of information are stored in the database 512. In particular, types of depicted information stored in the database 512 include, potentially among many other types of information, observational latency test data 506a and 506b, corresponding to a first test group 502 and a second test group 504, respectively. Latency measurements are often made within the resources of a network, whereas the common causes of latency remain outside among third party redirects, daisy chained calls, inefficient services, or intensive computation resources that are unaware of the relevant service level agreements (SLA) or the impact on the end user.

Metrics for network latency are often simplistic, overlooking the nature of the impact or its severity. This makes it hard to identify most likely causes and their specific resolution to address latency. Without specific measurable outcomes, it is hard to coordinate the ad call across an indefinite number of third parties to perform within acceptable end user latency. Particularly useful are metrics that characterize a host (or a resource) that appears once or multiple times to serve an ad call on several meaningful and relative measures. Predicting ultimate end to end test latency conditioned on the involvement of a controllable action for the call to a host, is the natural progression. This enables the network to prevent bad actions within their control that result in paths triggering higher than normal latencies.

As depicted in FIG. 5, test data from past observations of ad call tests conducting using a specialized data service (e.g., Gomez) may be obtained. As previously discussed, such a service may conduct tests such as back-bone, and last-mile. The back bone tests measure end-to-end latency from the backbone node making the request for an ad call and the ad being returned. The last-mile test measures the same end-to-end latency from the end user's perspective, on their computers. In some embodiments, any instrumentation traces may be corrected by removing the hops corresponding to the instrumentation services in the test call. Further, any bias in the calls arising from the difference in real time calls and the synthetic calls may also be corrected. In some embodiments the base data set for analysis may correspond to all test ad calls for the same property or ad unit, thus ensuring that the ads are of the same kind. Further by analyzing all tests within a backbone node separately accounts for other extraneous conditions impacting latency.

As shown in FIG. 5, for every host that appears in the exchange graph, two test populations may be created: test group 502 where the host appears at least once (some hosts appear more than once in an ad call) in an ad call, and test group 504 where the host never appears in an ad call. As depicted in block 514, one or more metrics for each of test group 502 and test group 504 may be computed based on the test data. The metric(s) may be selected from one or more metrics such as SLA violation percent, SLA violation severity, round trip test latency, gluttony index, etc. At block 516, a host effects ratio of the metric for test group 502 to the metric for test group 504 is computed. Using the round trip test latency as an example, the round trip test latency is computed for test group 502 and the test group 504. A ratio of the round trip test latency for test group 502 and the round trip test latency for test group 504 is then computed. By comparing the statistical differences between the two test populations or groups (e.g., by computing the ratio), as discussed above, the differences may be attributed to the host. For instance, using the end-to-end round trip latency as an example, if this latency metric is much higher for the test group with the host than for the test group without the host, the difference may be attributed to the host having a negative effect on that latency metric. Thus, in one embodiment, the hosts may be ranked in decreasing order based on the host effects ratio, as depicted in block 518.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The invention claimed is:

1. A method of determining the effect of a host on network latency comprising:
   using one or more server computers, obtaining observational test data relating to one or more network latency tests conducted on a plurality of hosts, the plurality of hosts including the host;
   using one or more server computers, creating a first group and a second group of hosts, wherein the first group includes the host and the second group doesn't include the host;
   using one or more server computers, computing at least one predetermined metric for each of the first group and the second group based on the test data;
   using one or more server computers, computing a ratio of the at least one predetermined metric for the first group to the at least one predetermined metric for the second group; and
   using one or more server computers, ranking the host based at least in part on the ratio.

2. The method of claim 1, further comprising:
   using one or more server computers, processing the test data to remove effects of instrumentation trace.

3. The method of claim 1, wherein the one or more network latency tests include one or more of a back-bone test and a last-mile test.

4. The method of claim 1, wherein the at least one metric includes one or more of SLA violation percent, SLA violation severity, round trip test latency, and gluttony index.

5. The method of claim 1, wherein the first group comprises a test population where the host appears at least once in an ad call.

6. The method of claim 1, wherein the second group comprises a test population where the host does not appear in an ad call.

7. The method of claim 1, further comprising:
   using one or more server computers, removing the host if the ratio exceeds a predetermined threshold.

8. The method of claim 1, further comprising:
   using one or more server computers, correcting the test data for bias resulting from the difference between real time ad calls and synthetic ad calls.

9. The method of claim 1, wherein the observational test data is obtained from a third party.

10. A system comprising:
    one or more server computers coupled to a network; and
    one or more databases coupled to the one or more server computers;
    wherein the one or more server computers are for:
      obtaining observational test data relating to one or more network latency tests conducted on a plurality of hosts, the plurality of hosts including the host;
      creating a first group and a second group of hosts, wherein the first group includes the host and the second group doesn't include the host;
      computing at least one predetermined metric for each of the first group and the second group based on the test data;

computing a ratio of the at least one predetermined metric for the first group to the at least one predetermined metric for the second group; and ranking the host based at least in part on the ratio.

11. The system of claim 10, wherein the one or more server computers are further configured for:

processing the test data to remove effects of instrumentation trace.

12. The system of claim 10, wherein the one or more network latency tests include one or more of a back-bone test and a last-mile test.

13. The system of claim 10, wherein the at least one metric includes one or more of SLA violation percent, SLA violation severity, round trip test latency, and gluttony index.

14. The system of claim 10, wherein the first group comprises a test population where the host appears at least once in an ad call.

15. The system of claim 10, wherein the second group comprises a test population where the host does not appear in an ad call.

16. The system of claim 10, wherein the one or more server computers are further configured for:

removing the host if the ratio exceeds a predetermined threshold.

17. The system of claim 10, wherein the one or more server computers are further configured for:

correcting the test data for bias resulting from the difference between real time ad calls and synthetic ad calls.

18. The system of claim 10, wherein the observational test data is obtained from a third party.

19. The system of claim 10 wherein the one or more server computers are further configured for:

providing performance feedback to the host based on the ratio.

20. A non-transitory computer readable medium containing instructions for causing a computer to execute a method, the method comprising:

obtaining observational test data relating to one or more network latency tests conducted on a plurality of hosts, the plurality of hosts including the host;

processing the test data to remove effects of instrumentation trace;

correcting the test data for bias resulting from the difference between real time ad calls and synthetic ad calls;

creating a first group and a second group of hosts, wherein the first group includes the host and the second group doesn't include the host;

computing at least one predetermined metric for each of the first group and the second group based on the test data;

computing a ratio of the at least one predetermined metric for the first group to the at least one predetermined metric for the second group; and ranking the host based at least in part on the ratio.

* * * * *